(12) United States Patent
Inoue et al.

(10) Patent No.: US 10,340,505 B2
(45) Date of Patent: Jul. 2, 2019

(54) PRODUCTION METHOD OF ELECTRODE LAMINATE

(71) Applicant: Toyota Jidosha Kabushiki Kaisha, Toyota-shi Aichi-ken (JP)

(72) Inventors: Hiroyuki Inoue, Susono (JP); Hitoshi Sato, Susono (JP); Hiroki Kubo, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 384 days.

(21) Appl. No.: 15/149,715

(22) Filed: May 9, 2016

(65) Prior Publication Data
US 2016/0329554 A1 Nov. 10, 2016

(30) Foreign Application Priority Data

May 8, 2015 (JP) ................. 2015-096061

(51) Int. Cl.
*H01M 4/04* (2006.01)
*H01M 10/0525* (2010.01)
(Continued)

(52) U.S. Cl.
CPC ......... *H01M 4/0404* (2013.01); *H01M 4/139* (2013.01); *H01M 10/0525* (2013.01);
(Continued)

(58) Field of Classification Search
CPC ........... H01M 10/0562; H01M 4/0404; H01M 4/139; H01M 10/0569; H01M 10/0525; H01M 10/0585
See application file for complete search history.

(56) References Cited

U.S. PATENT DOCUMENTS

2013/0142943 A1 6/2013 Kubo et al.
2014/0004257 A1* 1/2014 Kubo ................. H01M 4/0404
427/126.1
(Continued)

FOREIGN PATENT DOCUMENTS

JP 2010113819 A 5/2010
JP 2013118143 A 6/2013
(Continued)

OTHER PUBLICATIONS

Suzuki et al. JP 2010-113819 A Machine translation, May 2010, obtained from J-Plat Pat website (Year: 2010).*

*Primary Examiner* — Milton I Cano
*Assistant Examiner* — Jennifer A Moss
(74) *Attorney, Agent, or Firm* — Dinsmore & Shohl LLP (57) ABSTRACT

A method for producing an electrode laminate having a current collector layer, an active material layer and a solid electrolyte layer includes applying an active material slurry onto a surface of the current collector to form an active material slurry layer, and applying an electrolyte slurry onto a surface of the active material slurry layer to form an electrolyte slurry layer. The active material slurry contains butyl butyrate and heptane, the electrolyte slurry contains butyl butyrate or contains butyl butyrate and heptane, and the mass % concentration of heptane in a dispersion medium in the active material slurry layer is higher than the mass % concentration of heptane in a dispersion medium in the electrolyte slurry.

12 Claims, 4 Drawing Sheets

(51) Int. Cl.
　　　*H01M 10/0569*　　(2010.01)
　　　*H01M 4/139*　　　(2010.01)
　　　*H01M 10/0562*　　(2010.01)
　　　*H01M 10/0585*　　(2010.01)

(52) U.S. Cl.
　　　CPC ... *H01M 10/0562* (2013.01); *H01M 10/0569* (2013.01); *H01M 10/0585* (2013.01)

(56) References Cited

U.S. PATENT DOCUMENTS

| | | | | |
|---|---|---|---|---|
| 2015/0325844 | A1* | 11/2015 | Inoue | H01M 10/0562 429/304 |
| 2016/0028107 | A1* | 1/2016 | Kubo | H01M 10/0562 156/60 |
| 2016/0028108 | A1* | 1/2016 | Hashimoto | H01M 10/0562 156/60 |
| 2016/0226096 | A1* | 8/2016 | Tsujiko | H01M 10/0565 |
| 2016/0351899 | A1* | 12/2016 | Iwasaki | H01M 4/366 |
| 2017/0077548 | A1* | 3/2017 | Omori | H01M 10/0525 |
| 2017/0244097 | A1* | 8/2017 | Ose | H01M 4/136 |

FOREIGN PATENT DOCUMENTS

| | | | |
|---|---|---|---|
| JP | 2013127857 A | 6/2013 | |
| JP | 2015008073 A | 1/2015 | |

* cited by examiner

PRODUCTION METHOD OF ELECTRODE LAMINATE

TECHNICAL FIELD

The present disclosure relates to a production method of an electrode laminate. More specifically, the present disclosure relates to a production method of an electrode laminate, which can reduce the number of processes involved in the production of a battery, suppress a short circuit, and enhance the performance of a battery.

BACKGROUND ART

In recent years, an all-solid battery where the electrolytic solution is replaced with a solid electrolyte is attracting attention. Compared with a secondary battery using an electrolytic solution, since the all-solid battery uses no electrolytic solution, the problems of decomposition of the electrolytic solution and the like do not arise. Furthermore, the all-solid battery has high cycle durability and high energy density.

The production method of such an all-solid battery generally involves processes of applying an active material slurry onto a current collector layer, drying or calcining the slurry to form a dried active material layer, applying a solid electrolyte slurry onto the dried active material layer, and drying or calcining the slurry. Accordingly, with respect to a laminate in which two or more layers using a slurry-like raw material layer are stacked, the method of the laminate includes two or more processes of drying the slurry-like raw material, and therefore, there is a problem that it is unavoidable to increase the number of processes and prolong the time needed for the production of the laminate. Resolution of such a problem has been sought for.

The production method of a secondary battery of Patent Document 1 (Japanese Unexamined Patent Publication No. 2010-113819) includes processes of lamination-coating a first current collector layer with a positive electrode active material slurry layer, a solid electrolyte slurry layer, and a negative electrode active material slurry layer without drying the layers, drying the slurry layers collectively, and overlaying a second current collector layer thereon. Patent Document 1 describes that with respect to this production method of a secondary battery, a high-capacity secondary battery can be manufactured with high productivity.

The production method of a lithium ion battery of Patent Document 2 (Japanese Unexamined Patent Publication No. 2013-127857) includes applying an active material-containing slurry onto a current collector and applying a slurry containing inorganic particles, etc., on the active material-containing slurry; and drying these slurries to form an active material layer on the current collector layer and form an electrolyte layer containing inorganic particles, etc. on the active material layer. Patent Document 2 describes that with respect to this production method of a lithium ion battery, a metallic foreign material with a possibility getting mixed in during a conventional plurality of processes can be prevented from getting mixed in and an internal short circuit can be suppressed.

The production method of an all-solid battery of Patent Document 3 (Japanese Unexamined Patent Publication No. 2015-008073) includes applying a solid electrolyte slurry onto a surface of a negative electrode active material layer and drying the slurry to manufacture a negative electrode body; applying a solid electrolyte slurry onto a surface of a positive electrode active material layer and drying the slurry to manufacture a positive electrode body; and laminating together the solid electrolyte layer side of the negative electrode body and the solid electrolyte layer side of the positive electrode body with heat and pressure. Patent document 3 describes that with respect to this production method of an all-solid battery, at least either one of the solid electrolyte layer of the negative electrode body and the solid electrolyte layer of the positive electrode body is a glass-based solid electrolyte.

Furthermore, the production method of an electrode for all-solid batteries of Patent Document 4 (Japanese Unexamined Patent Publication No. 2013-118143) includes kneading an active material, a solid electrolyte, a binder and a solvent to prepare a slurry-like electrode composition; applying the prepared slurry-like electrode composition; and drying the applied slurry-like electrode composition. Patent document 4 describes that with respect to this production method of an electrode for all-solid batteries, the solvent contains a good solvent for the binder and a poor solvent for the binder, and that the good solvent for the binder includes heptane and the poor solvent for the binder includes butyl butyrate.

SUMMARY

The present inventors have found that when stacking an electrolyte slurry layer on an active material slurry layer without drying the active material slurry layer as in the method of Patent Document 1, solid components of respective slurry layers are mixed with each other on the contact surface therebetween and this may cause a short circuit at the time of use of the battery.

Therefore, an object of the present disclosure is to provide a production method of an electrode laminate, which can reduce the number of processes involved in the production of a battery, suppress a short circuit, and enhance the performance of a battery.

A method for producing an electrode laminate having a current collector layer, an active material layer, and a solid electrolyte layer is provided. The method includes applying an active material slurry onto a surface of the current collector layer to form an active material slurry layer, and applying an electrolyte slurry onto a surface of the active material slurry layer to form an electrolyte slurry layer. In embodiments, the active material slurry contains butyl butyrate and heptane, the electrolyte slurry contains butyl butyrate or butyl butyrate and heptane, and the mass % concentration of heptane in a dispersion medium in the active material slurry layer is higher than the mass % concentration of heptane in a dispersion medium in the electrolyte slurry. The method may further include applying another active material slurry onto a surface of the electrolyte slurry layer to form another active material slurry layer, with the another active material slurry containing butyl butyrate or butyl butyrate and heptane, and the mass % concentration of heptane in the dispersion medium in the electrolyte slurry is equal to or higher than the mass % concentration of heptane in a dispersion medium in the another active material slurry. In embodiments, the mass % concentration of heptane in the dispersion medium in the active material slurry is more than 0 mass % and 60 mass % or less. For example, the mass % concentration of heptane in the dispersion medium in the electrolyte slurry may be 0 mass % or more and 50 mass % or less. In embodiments, an all-solid battery having an electrode laminate produced by the method according to one or more embodiments disclosed herein is provided.

According to the present disclosure, a production method of an electrode laminate, which can reduce the number of processes involved in the production of a battery, suppress a short circuit, and enhance the performance of a battery, can be provided.

DETAILED DESCRIPTION

The embodiments of the present disclosure are described in detail below. The present disclosure is not limited to the following embodiments and can include various modifications therein within the scope of the gist of the present disclosure. In the description of drawings, like numbering represents like elements, and redundant explanation of these elements is omitted.

In the present disclosure, the "slurry layer" means a state where a slurry having an indefinite shape is formed into a layer.

In the present disclosure, the "solid component of the slurry layer" means all solid elements constituting the slurry layer, excluding the dispersion medium, for example, butyl butyrate, heptane, etc. Furthermore, in the present disclosure, when the "active material slurry" means a positive electrode active material slurry or a negative electrode active material slurry, the "another active material slurry" means a negative electrode active material slurry or a positive electrode active material slurry, respectively.

In the method of the present disclosure, an electrode laminate having a current collector layer, an active material layer, and a solid electrolyte layer is produced.

As for the production method of an electrode laminate, a wet-on-dry process is known, which includes applying an active material slurry on a current collector, drying the slurry to form an active material layer, applying an electrolyte slurry on the active material layer, and drying the slurry to form a solid electrolyte layer. This method has the possibilities of, for example, increasing the number of drying processes; allowing an impurity such as metal fragment to get mixed in before, after or during a drying process; and/or causing a reduction in the adhesive performance at the interface between the active material layer and the electrolyte layer.

On the other hand, the method of the present disclosure for producing an electrode laminate employs a so-called wet-on-wet process which includes applying an active material slurry onto a surface of a current collector to form an active material slurry layer, and applying an electrolyte slurry onto a surface of the active material slurry layer to form an electrolyte slurry layer.

Compared with the wet-on-dry process, in the wet-on-wet process, the number of processes involved in the production of an electrode laminate can be decreased, and/or the occasion for an impurity such as metal fragment to get mixed in can be reduced. Furthermore, in this process, the adhesive performance can be enhanced at the interface between the active material layer and the electrolyte layer which are formed by drying or calcining a plurality of stacked slurry layers, and in turn, the electrical conductivity, impact resistance, and the like of the battery can be improved.

The processes of applying an active material slurry to form an active material slurry layer, and of applying an electrolyte slurry on a surface of the active material slurry layer to form an electrolyte slurry layer may be performed simultaneously or sequentially.

Mixing of a solid component of the electrolyte layer into the active material layer and/or mixing of a solid component of the active material layer into the electrolyte layer are essentially may not be caused in the process of drying or calcining a plurality of stacked slurry layers but may be caused in the process of forming the active material slurry layer and the electrolyte slurry layer.

In the method of the present disclosure for producing an electrode laminate, the active material slurry contains butyl butyrate and heptane; the electrolyte slurry contains butyl butyrate or contains butyl butyrate and heptane; and the mass % concentration of heptane in a dispersion medium in the active material slurry is higher than the mass % concentration of heptane in a dispersion medium in the electrolyte slurry.

Due to this configuration, in the method of the present disclosure, even when an electrolyte slurry layer is present on an active material slurry layer, a solid component of the active material slurry layer can be prevented from getting mixed with a solid component of the electrolyte slurry layer.

Although not wishing to be bound by theory, the reason why in the method of the present disclosure, a solid component of the active material slurry layer does not get mixed with a solid component of the electrolyte slurry layer is believed to be the difference in the surface tension between the dispersion mediums in respective slurry layers.

In the case where the surface tension of the dispersion medium is relatively low, it is believed that the dispersion medium and a solid component of the slurry layer present in the dispersion medium are uniformly mixed and this mixed state is in a condition of relatively high stability. On the other hand, in the case where the surface tension of the dispersion medium is relatively high, it is believed that although the dispersion medium and a solid component of the slurry layer present in the dispersion medium are uniformly mixed, the mixed state is in a condition of relatively low stability.

Therefore, when the surface tension of the dispersion medium in the active material slurry is lower than the surface tension of the dispersion medium in the electrolyte slurry, it is believed that the active material slurry layer is relatively higher in stability than the electrolyte slurry layer and a solid component of the active material slurry layer and a solid component of the electrolyte slurry are prevented from mixing with each other.

In this connection, generally, the surface tension of heptane is lower than the surface tension of butyl butyrate and as the mass % concentration of heptane in the dispersion medium is higher, the surface tension of the dispersion medium is lower. For this reason, it is believed that since the mass % concentration of heptane in the dispersion medium in the active material slurry is higher than the mass % concentration of heptane in the dispersion medium in the electrolyte slurry, the active material slurry layer is relatively higher in stability than the electrolyte layer and a solid component of the active material slurry layer and a solid component of the electrolyte slurry are prevented from mixing with each other.

Due to this effect that solid components of respective slurry layers are prevented from mixing with each other, after a plurality of these stacked slurry layers are dried and calcined, a solid component of the electrolyte layer can be prevented from getting mixed into the active material layer, and vice versa.

Therefore, the electrolyte layer can fully exert the function as a separator, and a short circuit of the battery can be prevented. In addition, since the electrolyte layer fully exerts the function as a separator, the thickness of the electrolyte layer can be made smaller than for current solid batteries. As a result, the battery can be increased in the energy density or can provide compactness, and furthermore, the internal resistance of the battery can be reduced.

The method of the present disclosure optionally includes applying another active material slurry onto a surface of the electrolyte slurry layer to form another active material slurry layer. In this case, the another active material slurry contains butyl butyrate or contains butyl butyrate and heptane, and the mass % concentration of heptane in a dispersion medium in the electrolyte slurry is equal to or higher than the mass % concentration of heptane in a dispersion medium in the another active material slurry.

Due to this configuration, for example, an electrode laminate having an active material slurry layer, an electrolyte slurry layer, and an optional another active material slurry layer can be manufactured at a time.

In the conventional electrode laminate, an active material slurry layer, an electrolyte slurry layer, and an optional another active material layer are individually dried, but in the method of the present disclosure, these drying processes can be collectively performed and at the same time, the above-described battery performance can be enhanced.

The mass % concentration of heptane can be calculated as a ratio of the mass of heptane to the total mass of the dispersion medium. In view of chemical stability and from the standpoint of adjusting the surface tension, the dispersion medium preferably contains butyl butyrate and heptane.

The mass % concentrations of heptane in the dispersion mediums in the active material slurry, electrolyte slurry, and the optional another active material slurry are not particularly limited as long as the mass % concentration can be stepwise decreased in the order of the active slurry and the electrolyte slurry; or in the order of the active material slurry, the electrolyte slurry, and the another active material slurry.

The mass % concentration of heptane in the dispersion medium in the active material slurry may be 60 mass % or less, 55 mass % or less, 50 mass % or less, 45 mass % or less, or 40 mass % or less, and/or may be more than 0 mass %, 10 mass % or more, 15 mass % or more, 20 mass % or more, or 25 mass % or more.

From the standpoint of, for example, maintaining the viscosity of the slurry, the mass % concentration of heptane in the dispersion medium in the active material slurry is preferably more than 0 mass % and 60 mass % or less, more preferably 20 mass % or more and 45 mass % or less, still more preferably 25 mass % or more and 40 mass % or less.

The mass % concentration of heptane in the dispersion medium in the electrolyte slurry may be 50 mass % or less, 45 mass % or less, 40 mass % or less, 35 mass % or less, or 30 mass % or less, and may be 0 mass % or more, 10 mass % or more, 15 mass % or more, 20 mass % or more, or 25 mass % or more, on the condition that it is lower than the mass % concentration of heptane in the dispersion medium in the active material slurry.

From the standpoint of, for example, maintaining the viscosity of the slurry, the mass % concentration of heptane in the dispersion medium in the electrolyte slurry is preferably 0 mass % or more and 50 mass % or less, more preferably 0 mass % or more and 40 mass % or less, still more preferably 0 mass % or more and 20 mass % or less, on the condition that it is lower than the mass % concentration of heptane in the dispersion medium in the active material slurry.

The mass % concentration of heptane in the dispersion medium in the another slurry may be 50 mass % or less, 45 mass % or less, 40 mass % or less, 35 mass % or less, or 30 mass % or less, and may be 0 mass % or more, 10 mass % or more, 15 mass % or more, 20 mass % or more, or 25 mass % or more, on the condition that it is lower than the mass % concentration of heptane in the dispersion medium in the electrolyte slurry.

From the standpoint of, for example, maintaining the viscosity of the slurry, the mass % concentration of heptane in the dispersion medium in the another active material slurry is preferably 0 mass % or more and 50 mass % or less, more preferably 0 mass % or more and 40 mass % or less, still more preferably 0 mass % or more and 20 mass % or less, on the condition that it is lower than the mass % concentration of heptane in the dispersion medium in the electrolyte slurry.

In this case, heptane may not be added at the time of preparation of the electrolyte slurry, but it should be understood that when laminating the electrolyte slurry layer with the active material slurry layer, diffusion of the dispersion medium may occur, thereby allowing the dispersion medium, for example, heptane, in the active material slurry layer to diffuse into the electrolyte slurry, and the same applies to the preparation of the another active material slurry.

The method for applying the slurry is not particularly limited, and a known coating method such as blade coating, gravure coating, dip coating, reverse coating, roll knife coating, wire bar coating, slot die coating, air knife coating, curtain coating, extrusion coating, or a combination thereof may be employed.

Furthermore, after the lamination coating process, a process of drying and/or calcining the slurry, and/or a process of pressing may be employed. The drying and/or calcining process is not particularly limited, and a known drying and/or calcining process may be employed. The pressing process is not particularly limited, and a known pressing process may be employed.

The drying and/or calcining temperature is not particularly limited and includes, for example, a temperature ranging from ambient temperature to 500° C. The pressing pressure is not particularly limited as long as a predetermined filling rate, etc., of each layer can be achieved. The pressing pressure includes, for example, a pressure of 100 to 1,000 MPa.

A current collector layer is contained in an electrode laminate having an active material layer and an electrolyte layer.

The current collector layer includes a positive electrode current collector layer or a negative electrode current collector layer. The positive electrode current collector layer or negative electrode current collector layer is not particularly limited, and each current collector layer individually formed of various metals, such as silver, copper, gold, aluminum, nickel, iron, stainless steel or titanium, or an alloy thereof, may be used. In view of chemical stability, etc., the positive electrode current collector layer is preferably an aluminum current collector layer, and the negative electrode current collector layer is preferably a copper current collector layer.

An active material layer is contained in an electrode laminate having a current collector layer and an electrolyte layer. The active material layer is formed by drying and/or calcining an active material slurry layer. The active material slurry layer is formed by applying an active material slurry. The active material slurry includes a positive electrode active material slurry and a negative electrode active material slurry.

The positive electrode active material slurry contains a positive electrode active material, butyl butyrate and heptane, and optionally contains an electroconductive aid, a binder and a solid electrolyte.

The positive electrode active material includes a metal oxide containing lithium and at least one transition metal selected from manganese (Mn), cobalt (Co), nickel (Ni) and titanium (Ti), such as lithium cobaltate ($Li_xCoO_2$), lithium nickelate ($Li_xNiO_2$) and lithium nickel cobalt manganate ($Li_{1+x}Ni_{1/3}Co_{1/3}Mn_{1/3}O_2$), and a combination thereof.

The form of the positive electrode active material is preferably a powder. The average particle diameter of the positive electrode active material is not particularly limited but, for example, may be 1 µm or more, 3 µm or more, 5 µm or more, or 10 µm or more, and includes 100 µm or less, 50 µm or less, 30 µm or less, or 20 µm or less. The average particle diameter of the positive electrode active material is preferably from 1 to 50 µm, more preferably from 1 to 20 µm, still more preferably from 1 to 10 µm, yet still more preferably from 1 to 6 µm.

In the present disclosure, the particle diameter can be determined as a number average secondary particle diameter by directly measuring the projected area equivalent-circle particle diameter based on an image photographed by observation through a scanning electron microscope (SEM), a transmission electron microscope (TEM), etc., and analyzing particle groups having an aggregation number of 100 or more.

The electroconductive aid includes a carbon material such as VGCF (Vapor Grown Carbon Fiber), carbon black, Ketjen black, carbon nanotube and carbon nanofiber, a metal material, etc., and a combination thereof.

The binder is not particularly limited and includes a polymer resin such as polyvinylidene fluoride (PVDF), polytetrafluoroethylene (PTFE), polyimide (PI), polyimide (PA), polyamideimide (PAI), butadiene rubber (BR), styrene butadiene rubber (SBR), nitrile-butadiene rubber (NBR), styrene-ethylene-butylene-styrene block copolymer (SEBS) and carboxymethyl cellulose (CMC), and a combination thereof. In view of high-temperature durability, the binder resin includes polyimide, polyamide, polyamideimide, polyacryl, carboxymethyl cellulose, etc., and a combination thereof.

The solid electrolyte is not particularly limited, but a raw material usable as a solid electrolyte can be used. The solid electrolyte includes a sulfide-based amorphous solid electrolyte such as $75Li_2S\text{-}25P_2S_5$, $8Li_2O\cdot67Li_2S\cdot25P_2S_5$, $Li_2S$, $P_2S_5$, $Li_2S$—$SiS_2$, $LiI$—$Li_2S$—$SiS_2$, $LiI$—$Li_2S$—$P_2S_5$ and $LiI$—$Li_2S$—$B_2S_3$; an oxide-based amorphous solid electrolyte such as $Li_2O$—$B_2O_3$—$P_2O_5$ and $Li_2O$—$SiO_2$; a crystalline oxide such as $Li_{1.3}Al_{0.3}Ti_{0.7}(PO_4)_3$ and $Li_{1+x+y}A_xTi_{2-x}Si_yP_{3-y}O_{12}$ (wherein A is Al or Ga, $0 \leq x \leq 0.4$, and $0 < y \leq 0.6$); and a combination thereof. A sulfide-based amorphous solid electrolyte is preferably used because of having excellent lithium ion conductivity.

The form of the solid electrolyte is preferably a powder. The particle diameter of the solid electrolyte is, for example, preferably from 0.1 to 20 µm, more preferably from 0.2 to 10 µm, still more preferably from 0.3 to 6 yet still more preferably from 0.5 to 3 µm.

The negative electrode active material slurry contains a negative electrode active material, butyl butyrate and heptane, and optionally contains an electroconductive aid, a binder and a solid electrolyte.

The negative electrode active material is not particularly limited as long as it can store/release a metal ion such as lithium ion, but the negative electrode active material includes a metal such as Li, tin (Sn), silicon (Si) and indium (In), an alloy of lithium and titanium, magnesium and/or aluminum, a carbon raw material such as hard carbon, soft carbon and graphite, and a combination thereof.

As the electroconductive aid, binder and solid electrolyte of the negative electrode active material layer, the raw materials recited with respect to the positive electrode active material slurry can be used.

A solid electrolyte layer is contained in an electrode laminate having an active material layer and a current collector layer. The solid electrolyte layer is formed by drying and/or calcining an electrolyte slurry layer. The electrolyte slurry layer is formed by applying an electrolyte slurry.

The electrolyte slurry contains a solid electrolyte, butyl butyrate, and optionally heptane. As the electrolyte of the electrolyte slurry, the raw materials recited with respect to the positive electrode active material slurry can be used.

The thickness of the electrolyte slurry layer formed when applying the electrolyte slurry is not particularly limited but may be a thickness of 100 µm or less, 50 µm or less, 30 µm or less, 20 µm or less, 15 µm or less, or 12 µm or less, and may be a thickness of 5 µm or more, 7 µm or more, 8 µm or more, 9 µm or more, 10 µm or more, or 11 µm or more. Above all, from the standpoint of, as a battery, enhancing the energy density, providing compactness and/or decreasing the internal resistance, the thickness of the electrolyte slurry layer is preferably 5 µm or more and 100 µm or less, more preferably 8 µm or more and 30 µm or less, still more preferably 10 µm or more and 15 µm or less.

As for the constituents of the another active material layer and another active material slurry, descriptions regarding the active material layer and the active material slurry may be referred to. Incidentally, the another active material slurry optionally contains heptane.

The present disclosure is described in greater detail by referring to Examples below, but the scope of the present disclosure is of course not limited to these Examples.

EXAMPLES

Example 1

Preparation of Negative Electrode Active Material Slurry

A negative electrode active material slurry was obtained by mixing Mixture A. The configuration of Mixture A is shown below:
- 15 g of graphite as a negative electrode active material;
- 12 g of LiI—Li$_2$S—P$_2$S$_5$ as a solid electrolyte;
- 12 g of butyl butyrate as a dispersion medium;
- 8 g of heptane as a dispersion medium; and
- 3 g of others.

Mass % of each element was calculated from the mass of each element relative to the total mass of Mixture A. The mass % concentration of heptane in the dispersion medium was 40 mass %.

Preparation of Electrolyte Slurry

An electrolyte slurry was obtained by mixing Mixture B. The configuration of Mixture B is shown below:
- 15 g of LiI—Li$_2$S—P$_2$S$_5$ as a solid electrolyte;
- 15 g of butyl butyrate as a dispersion medium;
- 0 g of heptane as a dispersion medium; and
- 1 g of others.

Mass % of each element was calculated from the mass of each element relative to the total mass of Mixture B. The mass % concentration of heptane in the dispersion medium was 0 mass %.

Manufacture of Electrode Laminate

The negative electrode active material slurry above was applied onto a surface of a copper (Cu) foil as a current collector layer to form a negative electrode active material slurry layer, and the electrolyte slurry was applied onto a surface of the negative electrode active material slurry layer to form an electrolyte slurry layer, whereby a laminate was obtained. This laminate was dried at ambient temperature for 1 hour, further dried at 100° C. over 30 minutes, and pressed at 600 MPa to manufacture an electrode laminate.

Examples 2 and 3 and Comparative Example 1

Electrode laminates of Examples 2 and 3 and Comparative Example 1 were manufactured in the same manner as the electrode laminate of Example 1 other than the blending ratio of butyl butyrate and heptane was changed while keeping the total mass of butyl butyrate and heptane the same as in Example 1.

Examples 4 and 5

Electrode laminates of Examples 4 and 5 were manufactured in the same manner as the electrode laminate of Example 1 other than the blending ratio of butyl butyrate and heptane was changed while keeping the total mass of butyl butyrate and heptane the same as in Example 1, and other than the following positive electrode active material slurry layer was further formed. The mass ratio of butyl butyrate and heptane in the dispersion medium in each of a plurality of slurries as the raw materials of the electrode laminates of Examples 1 to 5 and Comparative Example 1, is shown in Table 1.

Preparation of Positive Electrode Active Material Slurry

A positive electrode active material slurry was obtained by mixing Mixture C. The configuration of Mixture C is shown below:
- 20 g of lithium nickel cobalt manganate as a positive electrode active material;
- 5 g of LiI—Li$_2$S—P$_2$S$_5$ as a solid electrolyte;
- 12 g of butyl butyrate as a dispersion medium;
- 0 g of heptane as a dispersion medium; and
- 1 g of others.

Mass % of each element was calculated from the mass of each element relative to the total mass of Mixture C. The mass % concentration of heptane in the dispersion medium was 0 mass %.

TABLE 1

| | Mass % Concentrations of Heptane and Butyl Butyrate in Dispersion Medium | | |
|---|---|---|---|
| | Negative electrode Active Material Slurry | Solid Electrolyte Slurry | Positive electrode Active Material Slurry |
| Example 1 | 40:60 | 0:100 | |
| Example 2 | 20:80 | 0:100 | |
| Example 3 | 60:40 | 0:100 | |
| Example 4 | 40:60 | 0:100 | 0:100 |
| Example 5 | 40:60 | 20:80 | 0:100 |
| Comparative Example 1 | 0:100 | 0:100 | |

Evaluation

As for the evaluation, evaluation of drying conditions, evaluation of cross-section and evaluation of short circuit were performed on the electrode laminate of each Example.

Evaluation of Drying Conditions of Electrode Laminate

The evaluation of drying conditions of the electrode laminate was performed by observing a scanning electron microscope (SEM) image of the cross-sections of negative electrode active material layer, solid electrolyte layer and positive electrode active material layer when drying the laminate of Comparative Example 1 in which a positive electrode active material slurry layer was further formed. The results are illustrated in FIGS. 1(a) to (c), and the drying conditions are shown below:
- the drying conditions of FIG. 1(a) were ambient temperature and 60 minutes;
- the drying conditions of FIG. 1(b) were 100° C. and 4 minutes; and
- the drying conditions of FIG. 1(c) were 150° C. and 1 minute.

Figure 1:
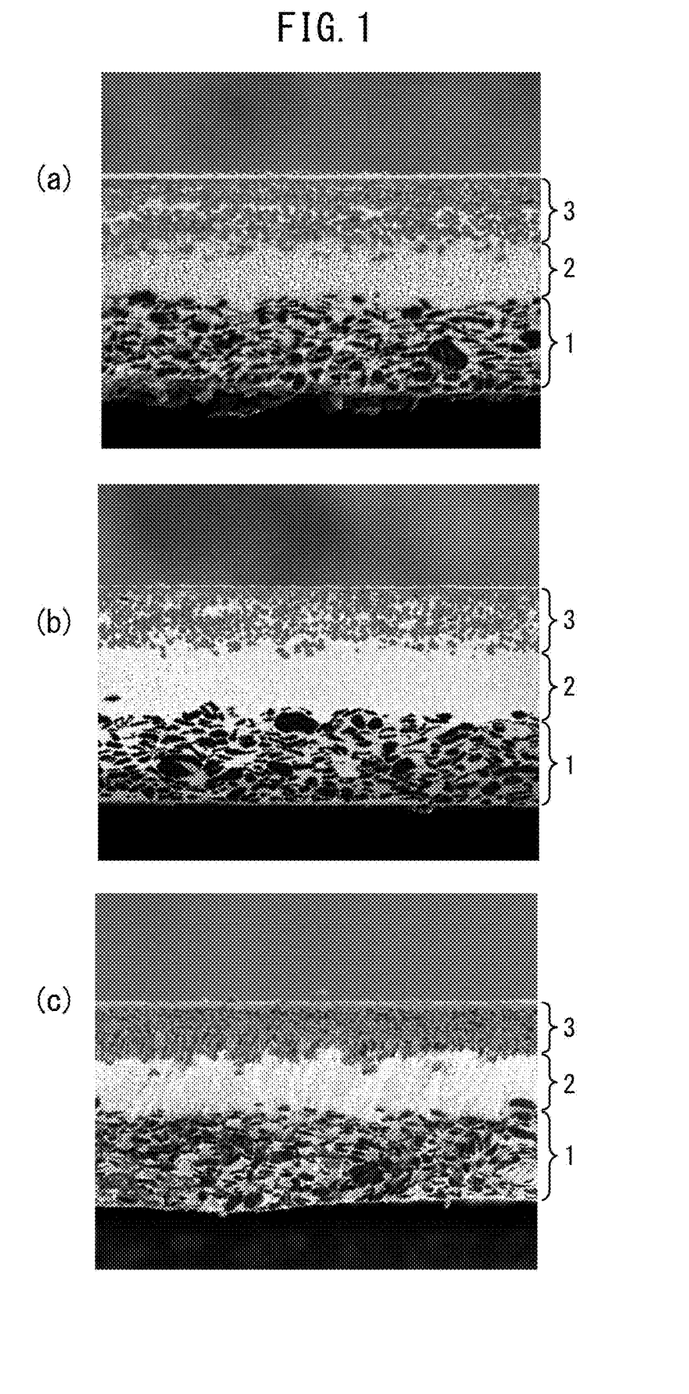
FIG. 1(a) is a scanning electron micrograph (SEM) image of the cross-section of an electrode laminate in which a slurry laminate in which a positive electrode active material slurry layer is further formed on the slurry laminate of Comparative Example 1, is naturally dried over 60 minutes.
FIG. 1(b) is a SEM image of the cross-section of an electrode laminate in which a slurry laminate in which a positive electrode active material slurry layer is further formed on the slurry laminate of Comparative Example 1, is dried at 100° C. over 4 minutes.
FIG. 1(c) is a SEM image of the cross-section of an electrode laminate in which a slurry laminate in which a positive electrode active material slurry layer is further formed on the slurry laminate of Comparative Example 1, is dried at 150° C. over 1 minute.

As shown in the SEM images of FIGS. 1(a), (b) and (c), even when different drying times and temperatures are employed, there is substantially no difference in terms of mixing of a solid component of the solid electrolyte layer into the positive electrode and/or negative electrode active material layers; and/or of mixing of a solid component of the positive electrode and/or negative electrode active material layers into the solid electrolyte layer. It is understood from this result that it is not the process of drying or calcining the positive electrode active material slurry layer, electrolyte slurry layer, and negative electrode active material slurry layer, but the process of forming these layers that has an effect on mixing of the components moving between layers.

Evaluation of Cross-Section of Electrode Laminate

The evaluation of cross-section of the electrode laminate was performed by observing a scanning electron microscope (SEM) image of the cross-section of each of the electrode laminates of Examples 1 to 5 and Comparative Example 1. The results are illustrated in FIGS. 2 to 6.

Figure 2:
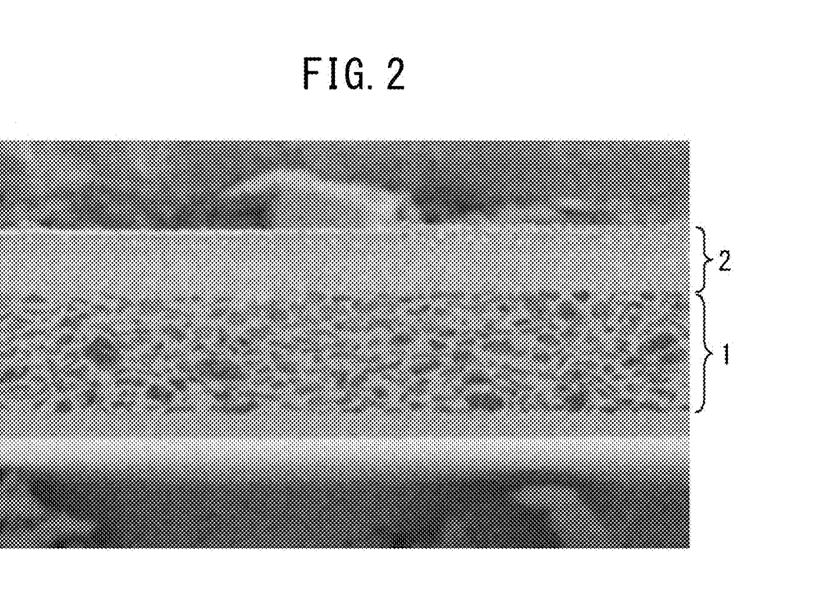
FIG. 2 is a SEM image of the cross-section of the electrode laminate of Example 1.

FIG. 2 is a SEM image of the cross-section of the electrode laminate of Example 1. It is seen from FIG. 2 that in the electrode laminate of Example 1, the negative electrode active material layer 1 and the solid electrolyte layer 2 are formed substantially linearly along the longitudinal direction, the interface therebetween is also formed substantially horizontally, and respective layers are formed in a substantially completely separated manner.

It is believed that because the mass % concentration of heptane in the dispersion medium in the negative electrode active material slurry as a raw material of the electrode laminate is 40%, and the mass % concentration of heptane in the dispersion medium in the electrolyte slurry is 0%, the surface tension of the negative electrode active material slurry layer becomes smaller than the surface tension of the electrolyte slurry layer, and therefore, a solid component of the negative electrode active material slurry layer can hardly move to or into the electrolyte slurry layer.

Figure 3:
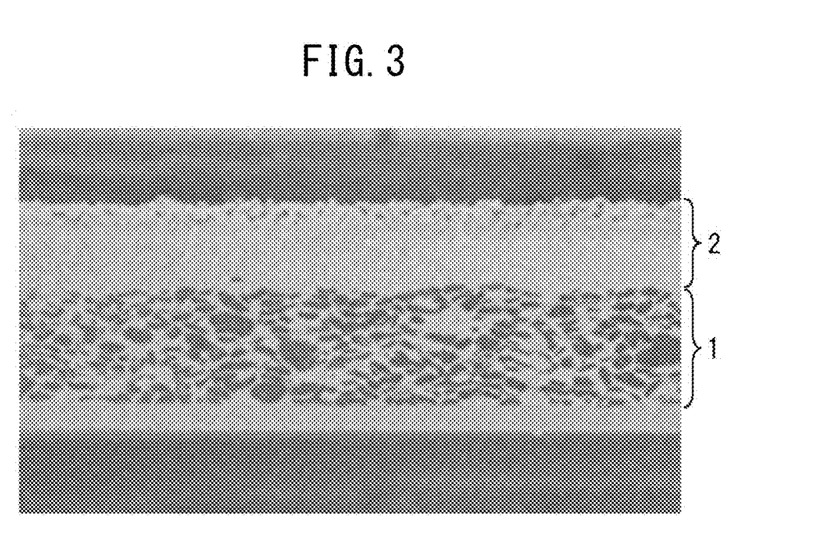
FIG. 3 is a SEM image of the cross-section of the electrode laminate of Example 2.

FIG. 3 is a SEM image of the cross-section of the electrode laminate of Example 2. It is seen from FIG. 3 that in the electrode laminate of Example 2, the negative electrode active material layer 1 and the solid electrolyte layer 2 are formed substantially linearly along the longitudinal direction, the interface therebetween partially has gentle unevenness but is formed substantially horizontally, and respective layers are formed in a substantially completely separated manner.

It is believed that because the mass % concentration of heptane in the dispersion medium in the negative electrode active material slurry as a raw material of the electrode laminate is 20%, and the mass % concentration of heptane in the dispersion medium in the electrolyte slurry is 0%, the surface tension of the negative electrode active material slurry layer becomes smaller than the surface tension of the electrolyte slurry layer, and therefore, a solid component of the negative electrode active material slurry layer can hardly move to or into the electrolyte slurry layer.

The reason why part of the interface of those slurry layers of the electrode laminate of Example 2 has gentle unevenness is believed to be that since the mass % concentration of heptane in the dispersion medium in the negative electrode active material slurry layer is 20% and low, the difference in the surface tension becomes small, and the movement of a solid component of the negative electrode active material slurry layer to the electrolyte slurry layer is relatively easy.

Figure 4:
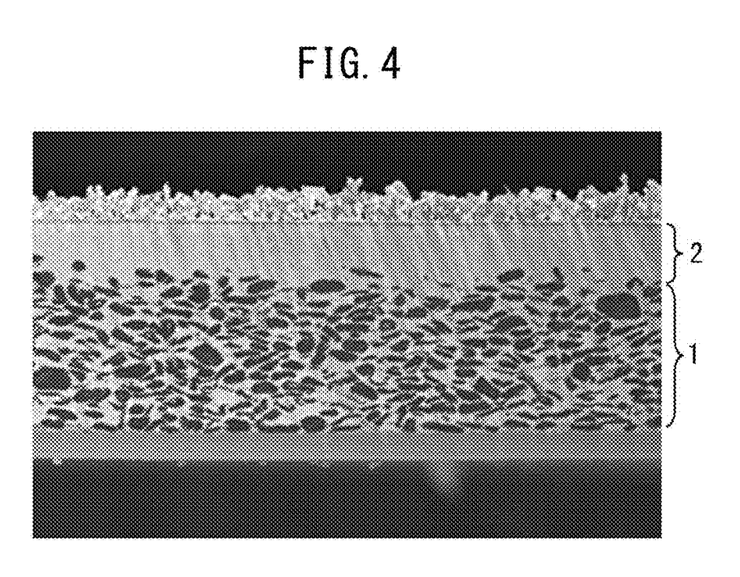
FIG. 4 is a SEM image of the cross-section of the electrode laminate of Example 3.

FIG. 4 is a SEM image of the cross-section of the electrode laminate of Example 3. It is seen from FIG. 4 that in the electrode laminate of Example 3, the negative electrode active material layer 1 and the solid electrolyte layer 2 are formed along the longitudinal direction, the interface therebetween is formed to have gentle unevenness, and respective layers are formed in a separated manner.

It is believed that because the mass % concentration of heptane in the dispersion medium in the negative electrode active material slurry as a raw material of the electrode laminate is 60%, and the mass % concentration of heptane in the dispersion medium in the electrolyte slurry is 0%, a large difference was generated in the surface tension between the negative electrode active material slurry layer and the electrolyte slurry layer but at the same time, the viscosity of the negative electrode active material slurry layer was reduced to allow for formation of the gentle unevenness.

Figure 5:
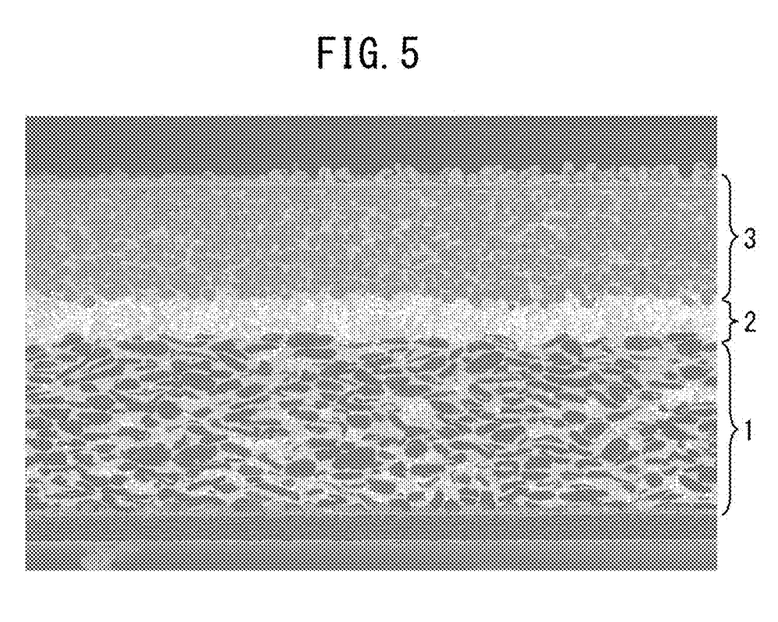
FIG. 5 is a SEM image of the cross-section of the electrode laminate of Example 4.
Figure 6:
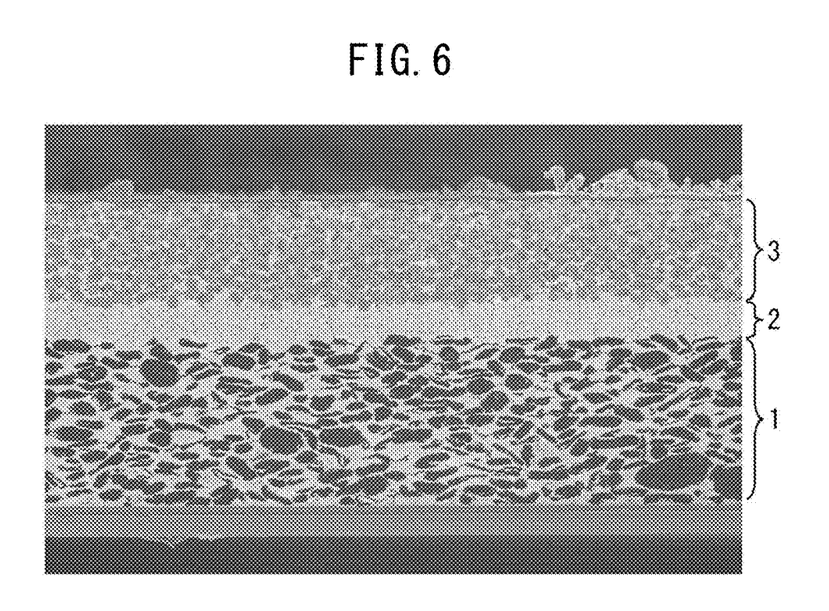
FIG. 6 is a SEM image of the cross-section of the electrode laminate of Example 5.

FIGS. 5 and 6 are SEM images of the cross-section of the electrode laminates of Examples 4 and 5. It is seen from FIGS. 5 and 6 that in each of the electrode laminates of Examples 4 and 5, the negative electrode active material layer 1, the solid electrolyte layer 2, and a positive electrode active material layer 3 are formed substantially linearly along the longitudinal direction, the interface therebetween is also formed substantially horizontally, and respective layers are formed in a substantially completely separated manner.

It is believed that because the negative electrode active material slurry layer, the electrolyte slurry layer, and the positive electrode active material slurry layer are stacked in this order and the mass % concentration of heptane in the dispersion medium of each slurry as a raw material thereof is decreased in this order, and thereby solid components of respective slurry layers are prevented from mixing with each other.

Furthermore, the difference between the electrode laminates of Examples 4 and 5 is the mass % concentration of heptane in the dispersion medium in the electrolyte slurry, and the concentration is 0% and 20%, respectively. It is seen from FIGS. 5 and 6 that even when the mass % concentration of heptane is different, solid components of respective slurry layers are prevented from mixing with each other.

Figure 7:
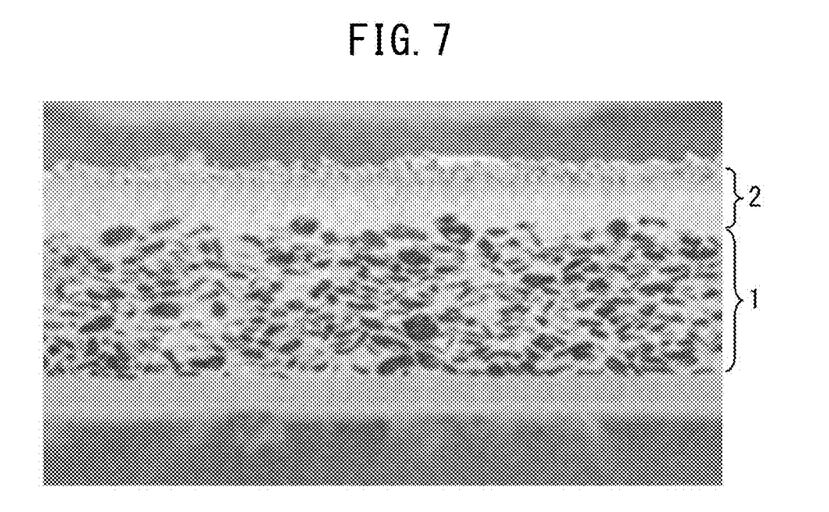
FIG. 7 is a SEM image of the cross-section of the electrode laminate of Comparative Example 1.

FIG. 7 is a SEM image of the cross-section of the electrode laminate of Comparative Example 1. It is seen from FIG. 7 that in the electrode laminate of Comparative Example 1, the interface between the negative electrode active material layer 1 and the solid electrolyte layer 2 is formed to have unevenness and part of the component of the negative electrode active material layer 1 gets mixed into the solid electrolyte layer 2.

It is believed that because the dispersion medium in each of the negative electrode active material slurry and electrolyte slurry as raw materials of the electrode laminate is composed of only butyl butyrate, a difference is not produced between the surface tensions of the negative electrode active material slurry layer and the electrolyte slurry layer.

Evaluation of Short Circuit of Electrode Laminate

The evaluation of short circuit of the electrode laminate was performed by stepwise decreasing the thickness of the solid electrolyte layer in each of the electrode laminates of Example 1 and Comparative Example 1 where a positive electrode active material layer was further formed, and measuring the thickness at which a short circuit was caused.

In Comparative Example 1, when the thickness of the solid electrolyte layer of the electrode laminate was 20 µm, the electrode laminate was electrically conducted and short-circuited. On the other hand, in Example 1, the thickness of the solid electrolyte layer of the electrode laminate was 12 µm, and nevertheless, a short circuit was not caused.

It is believed that because solid components of respective slurry layers are prevented from mixing with each other, also after calcining the stacked slurry layers, mixing of a solid component of the solid electrolyte layer into the positive electrode and/or negative electrode active material layers; and/or mixing of a solid content of the positive electrode and/or negative electrode active material layers into the solid electrolyte layer were suppressed, and therefore, the solid electrolyte layer was allowed to fully exert the function as a separator and prevent a short circuit of the battery.

While the preferred embodiments of the present disclosure is described in detail, it will be understood by one skilled in the art that the devices or chemicals, the manufacturers and grades thereof, the positions and arrangements of the production line, etc., which are employed in the method of the present disclosure, can be changed without departing from the scope of claims.

DESCRIPTION OF NUMERICAL REFERENCES

1 Negative electrode active material layer
2 Solid electrolyte layer
3 Positive electrode active material layer

What is claimed is:

1. A method for producing an electrode laminate having a current collector layer, an active material layer, and a solid electrolyte layer, comprising:
  applying an active material slurry onto a surface of the current collector layer to form an active material slurry layer, and
  applying an electrolyte slurry onto a surface of the active material slurry layer to form an electrolyte slurry layer,
  wherein a dispersion medium of the active material slurry contains butyl butyrate and heptane, wherein a mass % concentration of heptane in the dispersion medium of the active material slurry is more than 0 mass % and 60 mass % or less based on the weight of the dispersion medium in the active material slurry,
  wherein a dispersion medium of the electrolyte slurry contains butyl butyrate and heptane, and
  wherein the mass % concentration of heptane in the dispersion medium of the active material slurry layer is higher than the mass % concentration of heptane in the dispersion medium of the electrolyte slurry.

2. The method according to claim 1, further comprising:
  applying another active material slurry onto a surface of the electrolyte slurry layer to form another active material slurry layer,
  wherein a dispersion medium of the another active material slurry contains butyl butyrate or contains butyl butyrate and heptane, and
  wherein the mass % concentration of heptane in the dispersion medium of the electrolyte slurry is equal to or higher than a mass % concentration of heptane in the dispersion medium in the another active material slurry.

3. The method according to claim 1, wherein the mass % concentration of heptane in the dispersion medium in the electrolyte slurry is greater than 0 mass % and 50 mass % or less.

4. The method according to claim 2, wherein the mass % concentration of heptane in the dispersion medium in the electrolyte slurry is greater than 0 mass % and 50 mass % or less.

5. A method for producing an electrode laminate having a current collector layer, an active material layer, and a solid electrolyte layer, comprising:
  applying an active material slurry onto a surface of the current collector layer to form an active material slurry layer, and
  applying an electrolyte slurry onto a surface of the active material slurry layer to form an electrolyte slurry layer,
  wherein the active material slurry contains butyl butyrate and heptane,
  wherein the electrolyte slurry contains butyl butyrate and heptane, and
  wherein the mass % concentration of heptane in a dispersion medium in the active material slurry layer is higher than the mass % concentration of heptane in a dispersion medium in the electrolyte slurry.

6. The method according to claim 5, further comprising:
  applying another active material slurry onto a surface of the electrolyte slurry layer to form another active material slurry layer,
  wherein the another active material slurry contains butyl butyrate or contains butyl butyrate and heptane, and
  wherein the mass % concentration of heptane in the dispersion medium in the electrolyte slurry is equal to or higher than the mass % concentration of heptane in a dispersion medium in the another active material slurry.

7. The method according to claim 6, wherein the mass % concentration of heptane in the dispersion medium in the active material slurry is more than 0 mass % and 60 mass % or less.

8. The method according to claim 6, wherein the mass % concentration of heptane in the dispersion medium in the electrolyte slurry is more than 0 mass % and 50 mass % or less.

9. The method according to claim 7, wherein the mass % concentration of heptane in the dispersion medium in the electrolyte slurry is more than 0 mass % and 50 mass % or less.

10. The method according to claim 5, wherein the mass % concentration of heptane in the dispersion medium in the active material slurry is more than 0 mass % and 60 mass % or less.

11. The method according to claim 10, wherein the mass % concentration of heptane in the dispersion medium in the electrolyte slurry is more than 0 mass % and 50 mass % or less.

12. The method according to claim 5, wherein the mass % concentration of heptane in the dispersion medium in the electrolyte slurry is more than 0 mass % and 50 mass % or less.

* * * * *

UNITED STATES PATENT AND TRADEMARK OFFICE
CERTIFICATE OF CORRECTION

PATENT NO. : 10,340,505 B2
APPLICATION NO. : 15/149715
DATED : July 2, 2019
INVENTOR(S) : Hiroyuki Inoue, Hitoshi Sato and Hiroki Kubo Page 1 of 1

It is certified that error appears in the above-identified patent and that said Letters Patent is hereby corrected as shown below:

In the Specification

In Column 7, Line 62, after "polyimide (PI),", delete "polyimide" and insert --polyamide--, therefor.

In Column 8, Line 20, after "0.3 to 6", insert --μm--.

Signed and Sealed this
Twentieth Day of August, 2019

Andrei Iancu
*Director of the United States Patent and Trademark Office*